US012198623B2

(12) United States Patent
Yoo

(10) Patent No.: US 12,198,623 B2
(45) Date of Patent: Jan. 14, 2025

(54) APPLICATION PROCESSOR AND A DISPLAY DEVICE USING THE SAME

(71) Applicant: SAMSUNG DISPLAY CO., LTD., Yongin-si (KR)

(72) Inventor: Hyun Seuk Yoo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/941,122

(22) Filed: Sep. 9, 2022

(65) Prior Publication Data

US 2023/0169918 A1 Jun. 1, 2023

(30) Foreign Application Priority Data

Dec. 1, 2021 (KR) ........................ 10-2021-0170210

(51) Int. Cl.
*G09G 3/3233* (2016.01)
*G09G 3/20* (2006.01)
*G09G 3/3275* (2016.01)

(52) U.S. Cl.
CPC ......... *G09G 3/3233* (2013.01); *G09G 3/2096* (2013.01); *G09G 3/3275* (2013.01); *G09G 2300/0819* (2013.01); *G09G 2300/0842* (2013.01); *G09G 2310/0297* (2013.01); *G09G 2320/045* (2013.01)

(58) Field of Classification Search
CPC ... G09G 2320/0276; G09G 2320/0285; G09G 2320/0252; G09G 2320/043; G09G 2320/0233; G09G 2320/0666; G09G 2320/045; G09G 2340/16; G09G 2340/0428; G09G 3/3611; G09G 3/2059; G09G 3/3233; G09G 2360/16; G09G 2300/0452
See application file for complete search history.

(56) References Cited

U.S. PATENT DOCUMENTS

| | | | | | |
|---|---|---|---|---|---|
| 6,088,512 | A * | 7/2000 | Ancin | G09G 3/3611 | 358/1.9 |
| 2003/0080983 | A1* | 5/2003 | Someya | G09G 3/2011 | 345/690 |
| 2004/0075625 | A1* | 4/2004 | Kim | G09G 3/2059 | 345/60 |
| 2004/0189565 | A1* | 9/2004 | Someya | G09G 3/3611 | 345/87 |
| 2008/0174612 | A1* | 7/2008 | Someya | G09G 3/2044 | 345/89 |
| 2015/0116387 | A1 | 4/2015 | Jun et al. | | |

(Continued)

*Primary Examiner* — Dong Hui Liang
(74) *Attorney, Agent, or Firm* — F. CHAU & ASSOCIATES, LLC

(57) ABSTRACT

An application processor including: a compensation value calculator configured to calculate a compensation value of pixels disposed in a unit block of a pixel unit of a display device, based on imaging data; a storage unit configured to store a maximum compensation value and a minimum compensation value for each unit block; a linear converter configured to generate a mapped compensation value of the pixels disposed in one of the unit blocks by using the maximum compensation value and the minimum compensation value for that block; and a quantizer configured to generate quantization data by quantizing the mapped compensation value.

19 Claims, 17 Drawing Sheets

(56) References Cited

U.S. PATENT DOCUMENTS

| | | | | |
|---|---|---|---|---|
| 2015/0269904 | A1* | 9/2015 | Tsai | G09G 5/02<br>345/520 |
| 2021/0312883 | A1 | 10/2021 | Yoo et al. | |
| 2023/0073179 | A1* | 3/2023 | Park | G09G 3/2007 |

* cited by examiner

FIG. 9

| MCV | QDATA |
|---|---|
| +8 | $1111_{(2)}$ |
| +7.5 | $1110_{(2)}$ |
| +7 | $1101_{(2)}$ |
| +6.3 | $1100_{(2)}$ |
| +5 | $1011_{(2)}$ |
| +4.3 | $1010_{(2)}$ |
| +3 | $1001_{(2)}$ |
| +2.4 | $1000_{(2)}$ |
| +0.5 | $0111_{(2)}$ |
| -1.6 | $0110_{(2)}$ |
| -2 | $0101_{(2)}$ |
| -4.3 | $0100_{(2)}$ |
| -5 | $0011_{(2)}$ |
| -6 | $0010_{(2)}$ |
| -7.3 | $0001_{(2)}$ |
| -8 | $0000_{(2)}$ |

FIG. 12

| PQL1 | QDATA |
|---|---|
| +8 | $1111_{(2)}$ |
| +7 | $1110_{(2)}$ |
| +6 | $1101_{(2)}$ |
| +5 | $1100_{(2)}$ |
| +4 | $1011_{(2)}$ |
| +3 | $1010_{(2)}$ |
| +2 | $1001_{(2)}$ |
| +1 | $1000_{(2)}$ |
| −1 | $0111_{(2)}$ |
| −2 | $0110_{(2)}$ |
| −3 | $0101_{(2)}$ |
| −4 | $0100_{(2)}$ |
| −5 | $0011_{(2)}$ |
| −6 | $0010_{(2)}$ |
| −7 | $0001_{(2)}$ |
| −8 | $0000_{(2)}$ |

FIG. 13

| PQL2 |
|---|
| 30 |
| 28 |
| 26 |
| 24 |
| 22 |
| 20 |
| 18 |
| 16 |
| 14 |
| 12 |
| 10 |
| 8 |
| 6 |
| 4 |
| 2 |
| 0 |

FIG. 14

| PQL3 |
|---|
| 0 |
| -2 |
| -4 |
| -6 |
| -8 |
| -10 |
| -12 |
| -14 |
| -16 |
| -18 |
| -20 |
| -22 |
| -24 |
| -26 |
| -28 |
| -30 |

APPLICATION PROCESSOR AND A DISPLAY DEVICE USING THE SAME

CROSS-REFERENCE TO RELATED APPLICATION

The present application claims priority under 35 U.S.C. § 119(a) to Korean patent application 10-2021-0170210 filed on Dec. 1, 2021, in the Korean Intellectual Property Office, the disclosure of which is incorporated by reference herein in its entirety.

TECHNICAL FIELD

The present disclosure generally relates to an application processor and a display device using the same.

DISCUSSION OF RELATED ART

As interest in information displays and demand for portable information media increase, research and commercialization has focused on display devices.

SUMMARY

Embodiments of the present disclosure provide an application processor capable of generating appropriate compensation data for luminance correction in a display device having a low (or almost no) correlation between adjacent pixels, and a display device using the application processor.

In accordance with an embodiment of the present disclosure, there is provided an application processor including: a compensation value calculator configured to calculate a compensation value of pixels disposed in a unit block of a pixel unit of a display device, based on imaging data; a storage unit configured to store a maximum compensation value and a minimum compensation value for each unit block; a linear converter configured to generate a mapped compensation value of the pixels disposed in one of the unit blocks by using the maximum compensation value and the minimum compensation value for that block; and a quantizer configured to generate quantization data by quantizing the mapped compensation value.

The linear converter may generate the mapped compensation value by using a compression linear conversion method.

The compression linear conversion method may include a primary linear conversion equation, and in the primary linear conversion equation, the maximum compensation value may be set as $+2^n$, and the minimum compensation value may be set as $-2^n$.

The linear converter may generate the mapped compensation value by applying the compensation value of the pixels disposed in the unit block to the primary linear conversion equation.

The mapped compensation value may be in a range of $+2^n$ to $-2^n$.

The quantizer may quantize the mapped compensation value to be expressed with $2^n$ bits.

In accordance with an embodiment of the present disclosure, there is provided a display device including: a pixel unit including pixels disposed in a unit block; a memory configured to receive quantization data from an application processor, and store a predetermined quantization level corresponding to the quantization data; and a timing controller configured to generate compensation value data through data remapping, based on the quantization data and the predetermined quantization level.

The timing controller may include: a selector configured to receive the quantization data and the predetermined quantization level, and select a remapping compensation value, based on the quantization data and the predetermined quantization level; a data remapper configured to generate the compensation value data with a recovery linear conversion method by using the remapping compensation value received from the selector; and a compensator configured to receive the compensation value data, and generate compensation data by reflecting the compensation value data to input image data.

The predetermined quantization level may include a first quantization level, a second quantization level, and a third quantization level.

The selector may include a first value selector configured to receive the quantization data except a quantized maximum value and a quantized minimum value among the quantization data and the first quantization level, and select and output a pixel remapping compensation value, based on the quantization data and the first quantization level.

The selector may further include a second value selector configured to receive the quantized maximum value among the quantization data and the second quantization level, and select and output a maximum remapping compensation value, based on the quantized maximum value and the second quantization level.

The selector may further include a third value selector configured to receive the quantized minimum value among the quantization data and the third quantization level, and select and output a minimum remapping compensation value, based on the quantized minimum value and the third quantization level.

The recovery linear conversion method may include a primary linear reverse conversion equation, and in the primary linear inverse conversion equation, the compensation value data may be output by inputting the pixel remapping compensation value, the maximum remapping compensation value, and the minimum remapping compensation value.

The display device may further include a data driver configured to provide the pixels with a data signal to which the compensation data is applied.

The application processor may include: a compensation value calculator configured to calculate a compensation value of the pixels disposed in the unit block, based on the imaging data; a storage unit configured to store a maximum compensation value and a minimum compensation value for each unit block; a linear converter configured to generate a mapped compensation value of the pixels disposed in one of the unit blocks by using the maximum compensation value and the minimum compensation value for that block; and a quantizer configured to generate quantization data by quantizing the mapped compensation value.

The linear converter may generate the mapped compensation value by using a compression linear conversion method.

The compression linear conversion method may include a primary linear conversion equation, and in the primary linear conversion equation, the maximum compensation value may be set as $+2^n$, and the minimum compensation value may be set as $-2^n$.

The linear converter may generate the mapped compensation value by applying the compensation value of the pixels disposed in the unit block to the primary linear conversion equation.

The mapped compensation value may be in a range of $+2^n$ to $-2^n$.

The quantizer may quantize the mapped compensation value to be expressed with $2^n$ bits.

BRIEF DESCRIPTION OF THE DRAWINGS

Example embodiments of the present disclosure will now be described more fully hereinafter with reference to the accompanying drawings; however, the present disclosure may be embodied in different forms and should not be construed as limited to the embodiments set forth herein.

In the drawings, dimensions may be exaggerated for clarity of illustration. It will be understood that when an element is referred to as being "between" two elements, it can be the only element between the two elements, or one or more intervening elements may also be present. Like reference numerals may refer to like elements throughout this disclosure.

FIGS. 8 and 9 are diagrams illustrating quantization of mapped compensation values of the display device in accordance with an embodiment of the present disclosure.

FIGS. 12, 13 14 are diagrams illustrating a quantization level of the display device in accordance with an embodiment of the present disclosure.

DETAILED DESCRIPTION OF THE EMBODIMENTS

It will be understood that, although the terms "first", "second", etc. may be used herein to describe various elements, these elements should not be limited by these terms. These terms are merely used to distinguish one element from another element. Thus, a "first" element discussed below could also be termed a "second" element. As used herein, the singular forms are intended to include the plural forms as well, unless the context clearly indicates otherwise.

It will be further understood that the terms "includes" and/or "including", when used in this specification, specify the presence of stated features, integers, steps, operations, elements, and/or components, but do not preclude the presence and/or addition of one or more other features, integers, steps, operations, elements, components, and/or groups thereof.

Hereinafter, an application processor and a display device using the same in accordance with an embodiment of the present disclosure will be described in detail with reference to the accompanying drawings.

Figure 1:
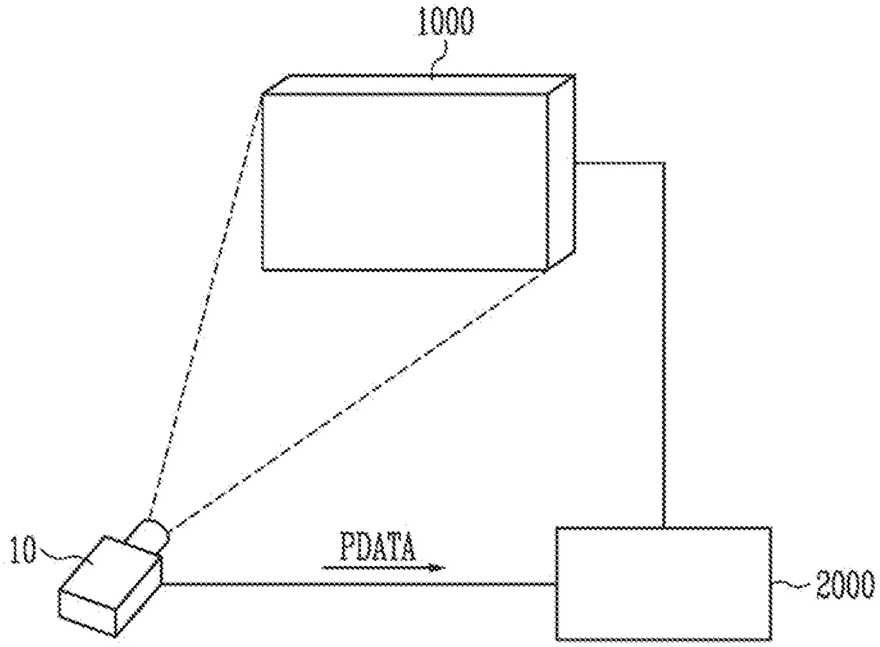
FIG. 1 is a diagram illustrating an imaging method for luminance correction of a display device in accordance with an embodiment of the present disclosure.
Figure 2:
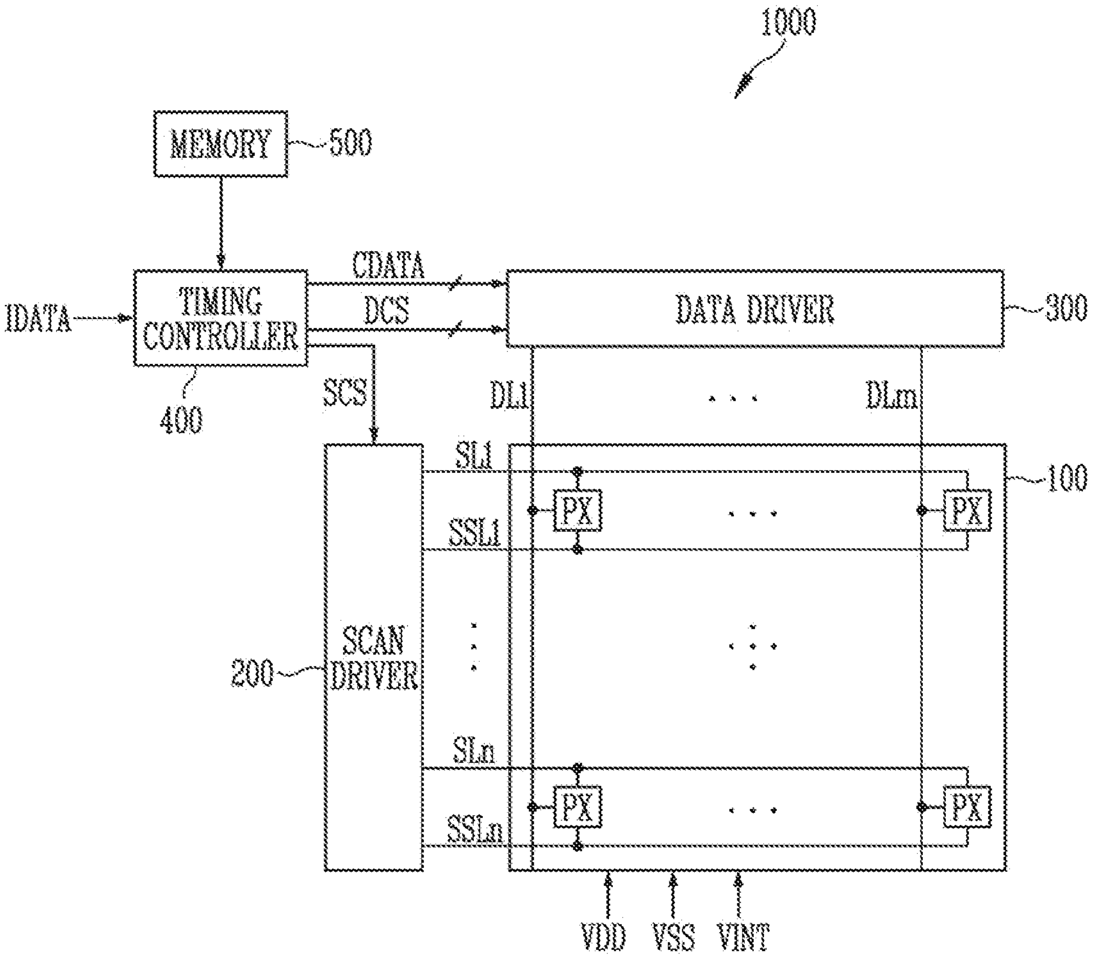
FIG. 2 is a diagram illustrating a configuration of the display device in accordance with an embodiment of the present disclosure.

FIG. 1 is a diagram illustrating an imaging method for luminance correction of a display device in accordance with an embodiment of the present disclosure. FIG. 2 is a diagram illustrating a configuration of the display device in accordance with an embodiment of the present disclosure.

Referring to FIG. 1, an imaging element 10 may be disposed to face a display device 1000 in accordance with the embodiment of the present disclosure to perform luminance correction of the display device 1000.

The imaging element 10 may image a light emission scene of a pixel unit included in the display device 1000, and transmit imaged imaging data PDATA to an application processor (AP) 2000.

The imaging element 10 may include a light receiving element such as a Charge-Coupled Device (CCD) camera. In addition, the imaging element 10 may not include a light receiving element but may be connected to an external light receiving element, to thereby receive a luminance image imaged by the external light receiving element.

The imaging method shown in FIG. 1 may be performed before the display device 1000 is released.

Referring to FIG. 2, the display device 1000 in accordance with the embodiment of the present disclosure may include a pixel unit 100, a scan driver 200, a data driver 300, a timing controller 400, and a memory 500.

The display device 1000 may include a flexible display device, a rollable display device, a curved display device, a transparent display device, a mirror display device, and the like, which are implemented as an organic light emitting display device, and the like. In an example, the display device 1000 may be implemented as a display device including a plurality of light emitting elements having a size of nanometer scale to micrometer scale.

The pixel unit 100 may include a plurality of pixels PX, and display an image. For example, the pixel unit 100 may include pixels PX disposed to be connected to a plurality of scan lines SL1 to SLn, a plurality of sensing control lines SSL1 to SSLn, and a plurality of data lines DL1 to DLm. In an embodiment of the present disclosure, each of the pixels PX may emit light of one of red, green, and blue. However, this is merely illustrative, and each of the pixels PX may emit light of cyan, magenta, yellow or the like. A first driving voltage VDD, a second driving voltage VSS, and an initialization voltage VINT may be supplied to the pixel unit 100 to be applied to the plurality of pixels PX.

The scan driver 200 may provide a scan signal to the pixels PX of the pixel unit 100 through the scan lines SL1 to SLn. The scan driver 200 may provide the scan signal to the pixel unit 100, based on a scan control signal SCS received from the timing controller 400.

The data driver 300 may provide the pixels PX of the pixel unit 100 with a data signal to which compensation data CDATA is applied through the data lines DL1 to DLm. The data driver 300 may provide a data signal (or data voltage) to the pixel unit 100, based on a data driving control signal DCS received from the timing controller 400. In an embodiment of the present disclosure, the data driver 300 may convert the compensation data CDATA into a data signal (or data voltage) in an analog form.

The timing controller 400 may receive input image data IDATA provided from an external graphic source (e.g., the application processor 2000) or the like, and receive a control signal and the like, provided from the outside, to control driving of the scan driver 200 and the data driver 300. The timing controller 400 may generate the scan control signal SCS and the data driving control signal DCS. In an embodiment of the present disclosure, the timing controller 400 may generate compensation data CDATA by compensating form the input image data IDATA. The compensation data CDATA may be provided to the data driver 300.

The memory 500 may store quantization data, and store a predetermined quantization level. The quantization data may be received from the application processor 2000. The predetermined quantization level may be a value pre-stored before the display device 1000 is released or a value newly stored in a process in which the display device 1000 is used. The predetermined quantization level may have levels and ranges, which correspond to the quantization data.

The memory 500 may transmit quantization data and a predetermined quantization level to the timing controller 400. The timing controller 400 may generate compensation value data through data remapping, based on the quantization data and the predetermined quantization level, and generate compensation data CDATA for image data compensation by using the compensation value data.

A detailed driving method of the application processor 2000, the timing controller 400, and the memory 500 will be described below with reference to FIGS. 3 and 14.

Figure 3:
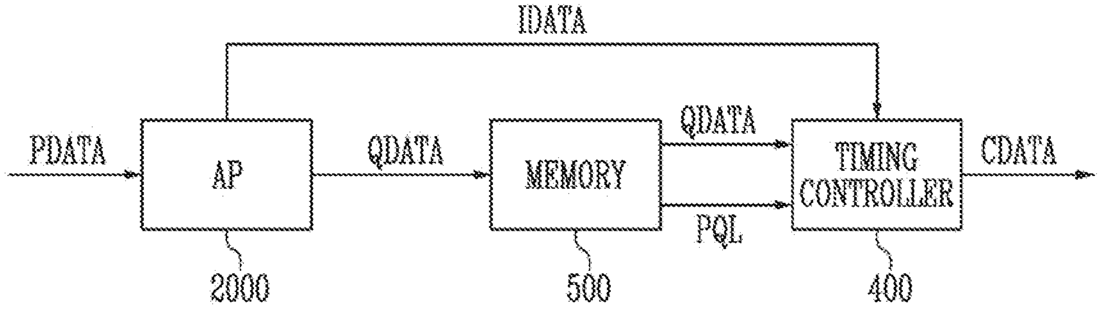
FIG. 3 is a diagram illustrating an application processor and the display device using the same in accordance with an embodiment of the present disclosure.
Figure 4:
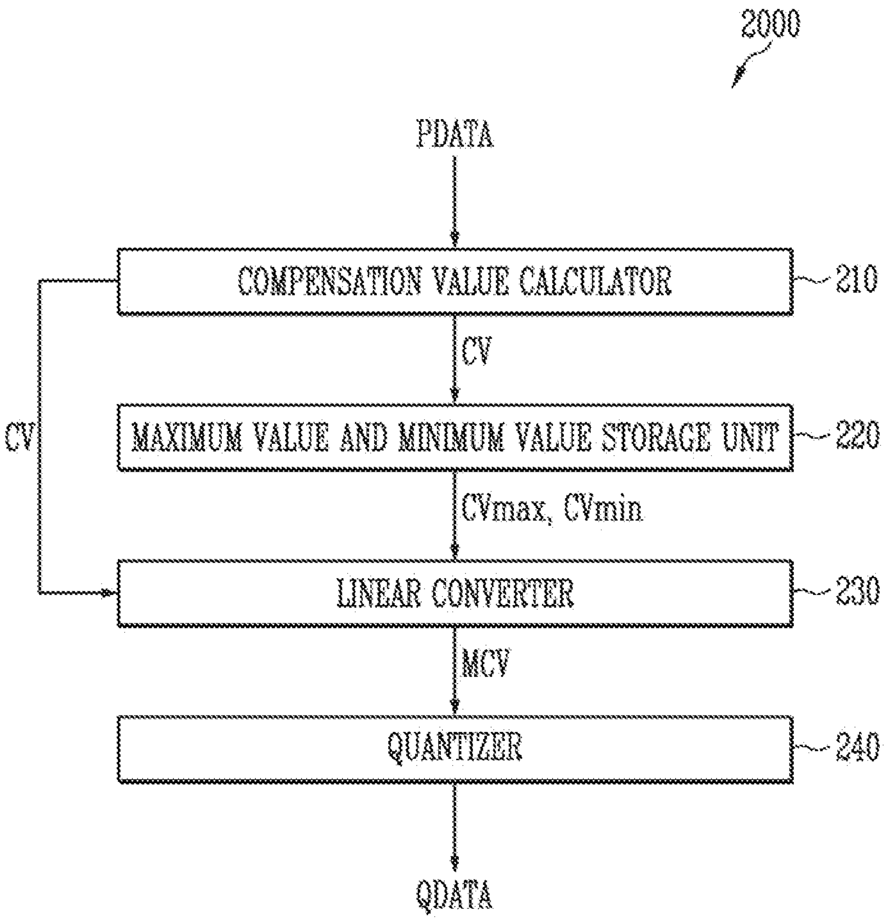
FIG. 4 is a diagram illustrating a configuration of the application processor in accordance with an embodiment of the present disclosure.
Figure 5:
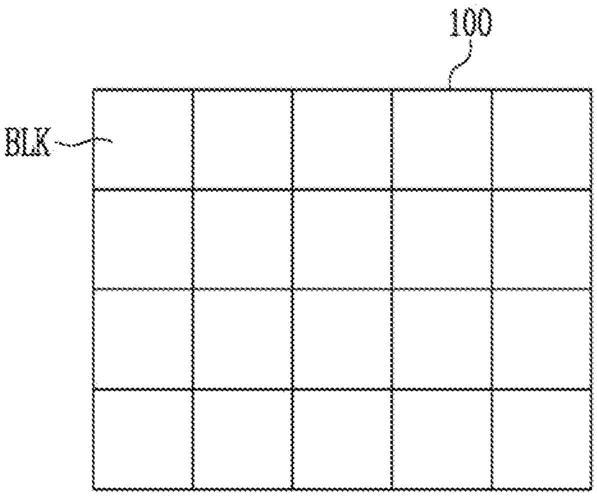
FIG. 5 is diagram illustrating a pixel unit of the display device in accordance with an embodiment of the present disclosure.
Figure 6:
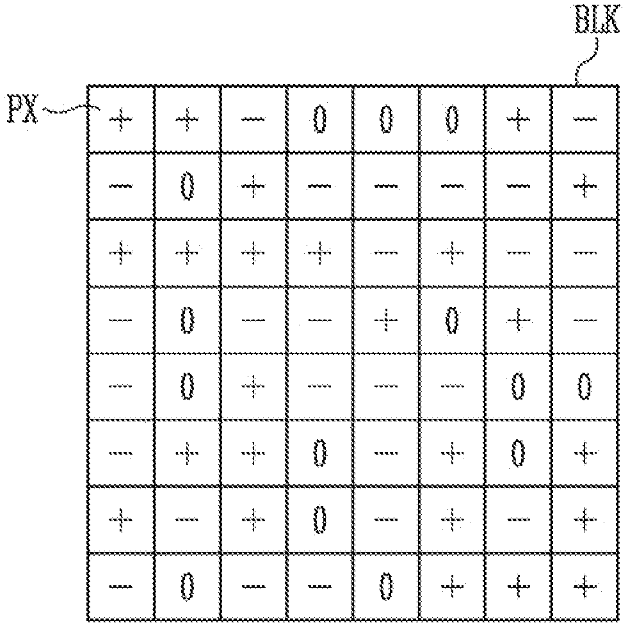
FIG. 6 is a diagram illustrating pixels of the pixel unit in accordance with an embodiment of the present disclosure.
Figure 7:
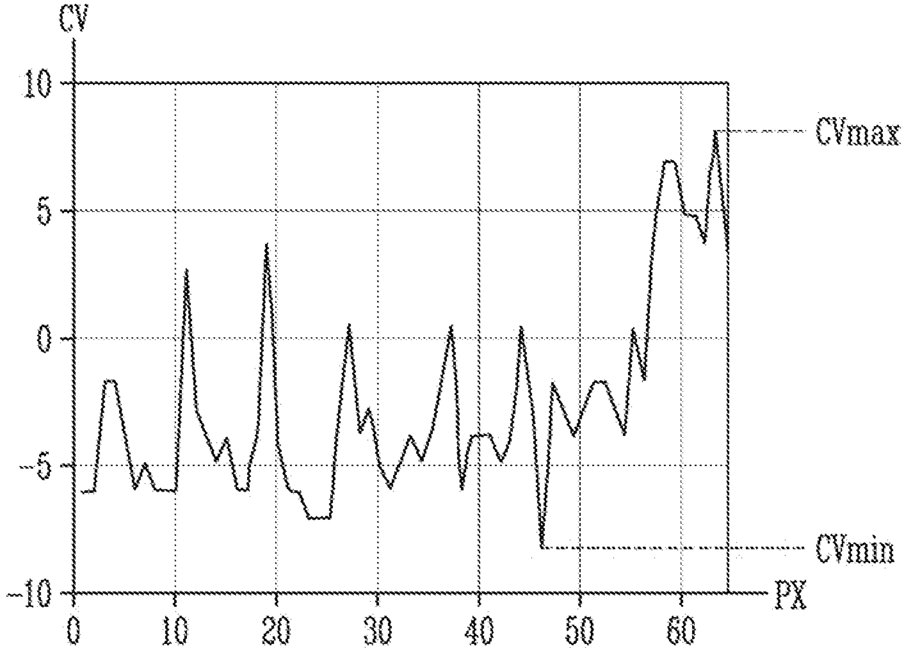
FIG. 7 is a diagram illustrating a compensation value with respect to each unit block of the display device in accordance with an embodiment of the present disclosure.
Figure 8:
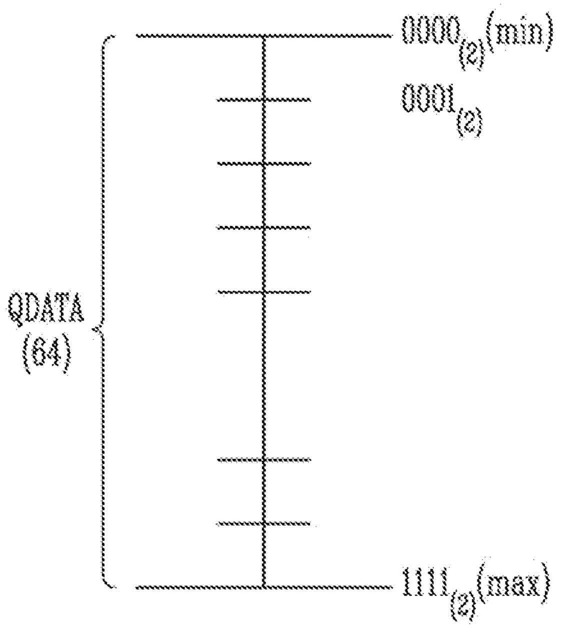
Figure 10:
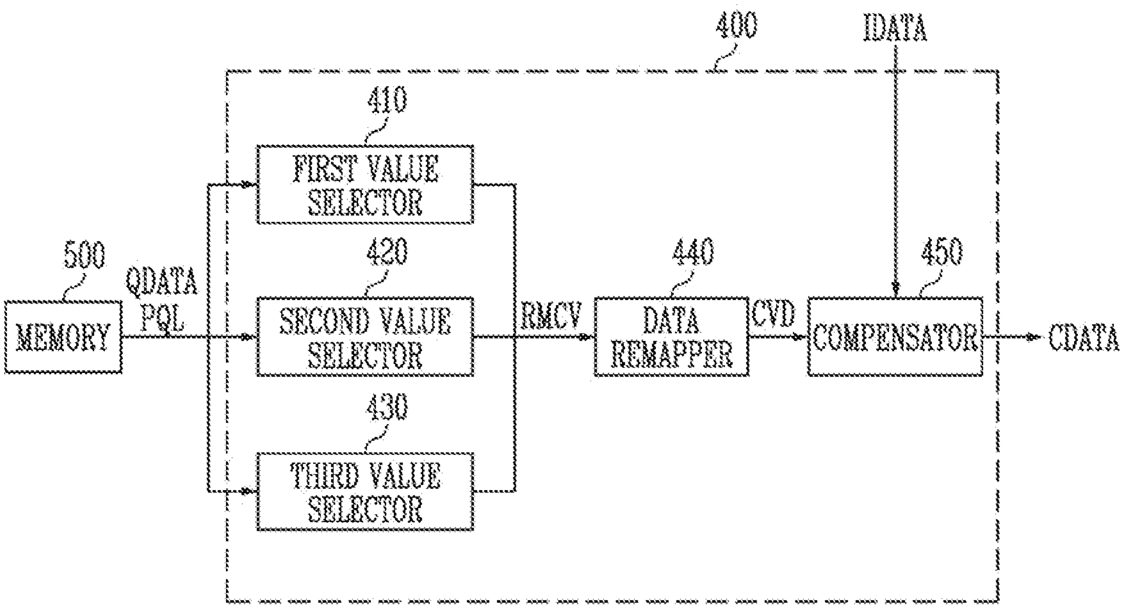
FIG. 10 is a diagram illustrating a configuration of a timing controller in accordance with an embodiment of the present disclosure.
Figure 11:
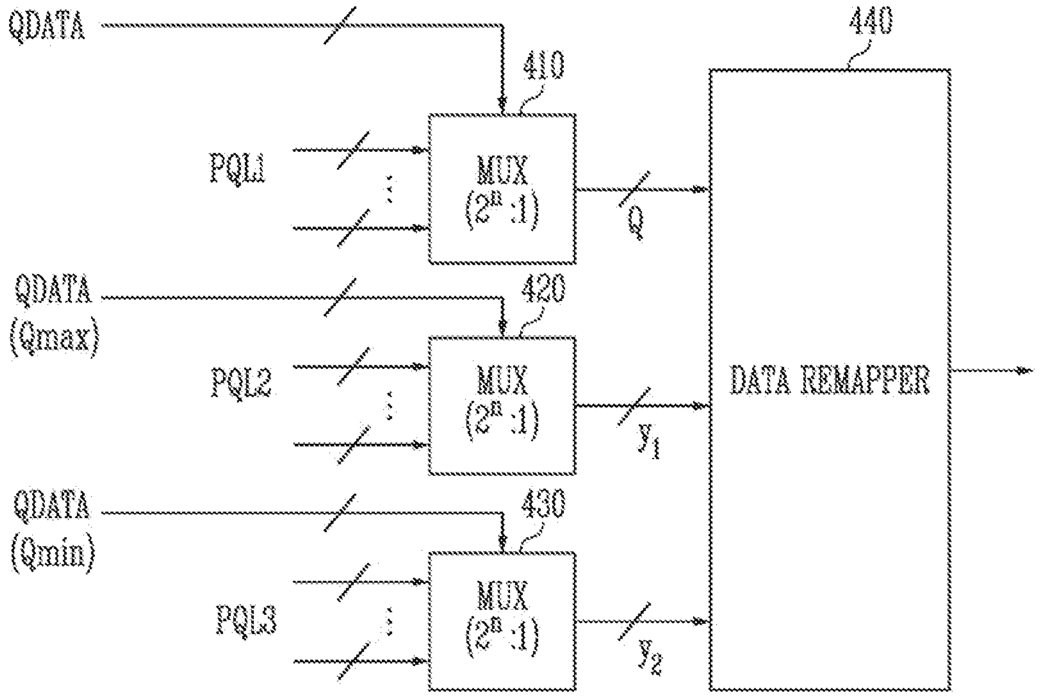
FIG. 11 is a diagram illustrating a driving method of a selector and a data remapper, which are shown in FIG. 10.

FIG. 3 is a diagram illustrating an application processor and the display device using the same in accordance with an embodiment of the present disclosure. FIG. 4 is a diagram illustrating a configuration of the application processor in accordance with an embodiment of the present disclosure. FIG. 5 is diagram illustrating a pixel unit of the display device in accordance with an embodiment of the present disclosure. FIG. 6 is a diagram illustrating pixels of the pixel unit in accordance with an embodiment of the present disclosure. FIG. 7 is a diagram illustrating a compensation value with respect to each unit block of the display device in accordance with an embodiment of the present disclosure. FIGS. 8 and 9 are diagrams illustrating quantization of mapped compensation values of the display device in accordance with an embodiment of the present disclosure. FIG. 10 is a diagram illustrating a configuration of the timing controller in accordance with an embodiment of the present disclosure. FIG. 11 is a diagram illustrating a driving method of a selector and a data remapper, which are shown in FIG. 10. FIGS. 12, 13 and 14 are diagrams illustrating a quantization level of the display device in accordance with an embodiment of the present disclosure.

First, referring to FIG. 3, the application processor 2000 in accordance with the embodiment of the present disclosure may transmit data to each of the memory 500 and the timing controller 400 of the display device 1000.

The application processor 2000 may receive imaging data PDATA from the imaging element 10 (see FIG. 1), and calculate a compensation value of pixels PX disposed in a unit block of the pixel unit 100, based on the imaging data PDATA. The application processor 2000 may store a maximum value and a minimum value for each unit block of the pixel unit 100 in the compensation value of the pixels PX. The application processor 2000 may generate a mapped compensation value by mapping a compensation value of pixels PX disposed in each unit block of the pixel unit 100 through a compression linear conversion method, using the maximum value and the minimum value. Subsequently, the application processor 2000 may generate quantization data QDATA by quantizing the mapped compensation value.

The memory 500 may receive the quantization data QDATA from the application processor 2000, and transmit the received quantization data QDATA to the timing controller 400. In addition, the memory 500 may pre-store a predetermined quantization level PQL, and transmit the predetermined quantization level PQL to the timing controller 400.

The timing controller 400 may receive the quantization data QDATA and the predetermined quantization level PQL from the memory 500, and receive input image data IDATA from the application processor 2000. The timing controller 400 may select a remapping compensation value of pixels PX disposed in each unit block of the pixel unit 100 by using the quantization data QDATA and the predetermined quantization level PQL, and generate compensation value data through a recovery linear conversion method by using the remapping compensation value. In addition, the timing controller 400 may generate compensation data CDATA by reflecting the compensation value data to the input image data IDATA. The timing controller 400 may supply the compensation data CDATA to the data driver 300.

In other words, in an embodiment of the present disclosure, quantization data may be generated by using a maximum value and a minimum value among compensation value data of pixels PX for each unit block of the pixel unit 100. Thus, appropriate compensation data for luminance correction can be generated even when a correlation between adjacent pixels PX is low.

Referring to FIG. 4, the application processor 2000 in accordance with the embodiment of the present disclosure may include a compensation value calculator 210, a maximum value and minimum value storage unit 220, a linear converter 230, and a quantizer 240.

The compensation value calculator 210 may receive imaging data PDATA from the imaging element 10, and calculate a compensation value CV of pixels PX disposed in a unit block of the pixel unit 100, based on the imaging data PDATA. The imaging data PDATA may correspond to a light emission grayscale of the pixels PX.

Referring to FIG. 5, in an embodiment of the present disclosure, the pixel unit 100 may be divided into a plurality of unit blocks BLK. The shape, size, and/or number of unit blocks BLK may be various in some embodiments. For example, each unit block BLK may have a square shape, and 20 unit blocks BLK may constitute one pixel unit 100. In another example, each unit block BLK may have a square shape, and 40 unit blocks BLK may constitute one pixel unit 100.

Referring to FIG. 6, in an embodiment of the present disclosure, a plurality pixels PX may be disposed in each unit block BLK. For example, 64 pixels PX may be disposed in a form of 8×8 in one unit block BLK.

In other words, the compensation value calculator 210 may calculate a compensation value CV of pixels PX for each unit block BLK, based on imaging data PDATA of the pixels PX. For example, pixels PX having a dark grayscale in one unit block BLK may have a positive value as the compensation value CV to increase the grayscale through luminance correction, and pixels PX having a bright grayscale in the one unit block BLK may have a negative value as the compensation value CV to decrease the grayscale through luminance correction. In other words, pixels PX having a first value as the compensation value CV may be used to increase the grayscale through luminance correction, and pixels PX having a second value as the compensation value CV may be used to decrease the grayscale through luminance correction. Pixels PX which are unnecessary for luminance correction may have a value of 0 as the compensation value CV.

The maximum value and minimum value storage unit 220 may receive compensation values CV of pixels PX for each unit block BLK from the compensation value calculator 210, and select and store a maximum value CVmax (or maximum compensation value) and a minimum value CVmin (or minimum compensation value) of each unit block BLK among the compensation values CV. In an example, since each of the maximum value CVmax and the minimum value CVmin is 4 bits, the maximum value and minimum value storage unit 220 may store data of 8 bits for each unit block BLK. Accordingly, the size of a memory for storing the compensation value CV can be reduced, and cost for implementing the application processor 2000 can be saved.

The horizontal axis of a graph shown in FIG. 7 lists pixels PX of one unit block BLK, and the vertical axis of the graph shown in FIG. 7 represents a compensation value CV of each pixel PX.

Referring to FIG. 7, it can be seen that compensation values CV of pixels PX, which are calculated for each unit block BLK of the pixel 100 in accordance with the embodiment of the present disclosure, are different from each other according to each pixel PX. In addition, it can be seen that a maximum compensation value Cmax and a minimum compensation value CVmin in each unit block BLK can be secured. In an example, when 64 pixels PX in one unit block BLK are located on the horizontal axis, the pixels PX may be listed on the horizontal axis by matching positions of the pixels PX to (1, 1), (1, 2), (1, 3), and the like according to row and column directions, and compensation values CV corresponding to the pixels PX of the horizontal axis may be illustrated on the vertical axis. For example, the maximum compensation value CVmax in the one unit block BLK may be +8, and the minimum compensation value CVmin in the one unit block BLK may be −8. The maximum compensation value CVmax and the minimum compensation value CVmin may be variously changed.

In other words, the maximum value and minimum value storage unit 220 may select a maximum value CVmax and a minimum value CVmin from compensation values CV of pixels PX of each unit block BLK, and store the maximum value CVmax and the minimum value CVmin. In an embodiment of the present disclosure, since a maximum compensation value and a minimum compensation value of pixels PX of each unit block BLK are stored, a compensation value of pixels PX located adjacent to each other in each unit block BLK is not reflected. Instead, an arbitrary compensation value having no correlation with peripheral pixels may be selected and stored. Accordingly, in a display device having a low correlation between adjacent pixels or having barely any correlation between adjacent pixels, appropriate compensation data for luminance correction can be generated.

The linear converter 230 may receive a maximum value CVmax and a minimum value CVmin of each unit block BLK from the maximum value and minimum value storage unit 220, and generate a mapped compensation value MCV by mapping a compensation value CV of pixels PX disposed in each unit block BLK through the compression linear conversion method, using the maximum value CVmax and the minimum value CVmin. A number of mapped compensation value MCV may be equal to a number obtained by subtracting 2 (e.g., a number of pixels corresponding to the maximum value and the minimum value) from a number of pixels PX disposed in each unit block BLK.

In an embodiment of the present disclosure, the compression linear conversion method may correspond to primary linear conversion. In an example, a primary linear conversion equation may correspond to the following Equations 1 and 2.

$$\alpha \cdot x_1 + \beta = +8 \quad \text{Equation 1}$$

$$\alpha \cdot x_2 + \beta = -8 \quad \text{Equation 2}$$

Here, $x_1$ is a maximum value CVmax, and $x_2$ is a minimum value CVmin. In addition, constants +8 and −8 may be values for allowing a quick and simple calculation to be performed, when a compensation value (or quantized compensation value) is decoded. In an embodiment of the present disclosure, +8 and −8 are set as example. However, in some embodiments of the present disclosure, the constants may be $+2^n$ and $-2^n$ (n is a natural number).

When a calculation is performed by using Equations 1 and 2, α and β may correspond to the following Equations 3 and 4.

$$\alpha = \frac{16}{x_1 - x_2} \quad \text{Equation 3}$$

$$\beta = \frac{-\alpha(x_1 + x_2)}{2} \quad \text{Equation 4}$$

Accordingly, a primary linear conversion equation may be derived as shown in the following Equation 5.

$$f(x) = \frac{16x - 8(x_1 + x_2)}{x_1 - x_2} \quad \text{Equation 5}$$

Here, x may correspond to compensation values CV of pixels PX disposed in each unit block BLK, which are calculated through the compensation value calculator 210.

The linear converter 230 may convert (or map) the compensation values CV of the pixels PX disposed in each unit block BLK through Equation 5. In an embodiment of the present disclosure, the mapped compensation values MCV may correspond to a range of a minimum value (e.g., $-2^n$) to a maximum value (e.g., $+2^n$). In an example, when 64 pixels PX are disposed in each unit block BLK, the linear converter 230 may calculate 64 mapped compensation values MCV. The mapped compensation values MCV may correspond to a range of a minimum value (e.g., −8) to a maximum value (e.g., +8).

The quantizer 240 may receive the mapped compensation values MCV from the linear converter 230, and generate quantization data QDATA by quantizing the mapped compensation values MCV to be expressed with $2^m$ bits (m is a natural number), based on the mapped compensation values MCV.

In an example, when the compensation values CV of the pixels PX disposed in each unit block BLK, which are calculated through the compensation value calculator 210, have 8 bits, a data compression rate may correspond to 1/2 when the compensation values CV of the pixels PX disposed in each unit block BLK are expressed with 4 bits through quantization. Accordingly, cost for providing an additional memory can be saved.

Referring to FIG. 8, the quantizer 240 may quantize the mapped compensation values MCV of the pixels PX disposed in each unit block BLK to be expressed with 4 bits. The mapped compensation values MCV may be quantized to correspond to a range of $0000_{(2)}$ to $1111_{(2)}$. For example, when the number of the pixels PX disposed in each unit block BLK is 64, and the number of the mapped compensation values MCV is 64, the quantizer 240 may generate 64 quantization data QDATA.

Referring to FIG. 9, quantization data QDATA about 16 mapped compensation values MCV among 64 mapped compensation values MCV is illustrated.

In an example, the quantizer 240 may quantize, as $1111_{(2)}$, +8 as a maximum value among the mapped compensation values MCV, and quantize, as $0000_{(2)}$, −8 as a minimum value among the mapped compensation values MCV. In addition, the quantizer 240 may quantize a mapped compensation value MCV of +4.3 as $1010_{(2)}$, and quantize a mapped compensation value MCV of −4.3 as $0100_{(2)}$. In other words, quantization data QDATA of the maximum value among the mapped compensation values MCV may be $1111_{(2)}$, and quantization data QDATA of the minimum value among the mapped compensation values MCV may be $0000_{(2)}$. In an embodiment of the present disclosure, that the quantizer 240 quantizes the mapped compensation values MCV is not to express the mapped compensation values MCV with binary numerals but to appropriately match the mapped compensation values, corresponding to a bit size to be compressed and an order of the mapped compensation values MCV.

Although quantization data about some compensation values among the mapped compensation values have been illustrated in FIG. 9, the other mapped compensation values may correspond to quantization data. In addition, the quantizer 240 may process the mapped compensation values MCV such that approximate values correspond to the quantization data QDATA through decimal point round-up/down, and allow the processed mapped compensation values MCV to the quantization data QDATA shown in FIG. 9.

Referring to FIG. 10, the timing controller 400 in accordance with the embodiment of the present disclosure may include a first value selector 410, a second value selector 420, a third value selector 430, a data remapper 440, and a compensator 450. The first value selector 410, the second value selector 420, and the third value selector 430 may be commonly referred to as a selector.

The selector may receive quantization data QDATA and a predetermined quantization level PQL from the memory 500. The selector may select and output a remapping compensation value RMCV, based on the received quantization data QDATA and the received predetermined quantization level PQL. The remapping compensation value RMCV is a value obtained by decoding the quantization data QDATA, and may be a value which is equal to or corresponds to the mapping compensation value MCV of the application processor 2000. The remapping compensation value RMCV may include a pixel remapping compensation value Q (see FIG. 11), a maximum remapping compensation value $y_1$ (see FIG. 11), and a minimum remapping compensation value $y_2$ (see FIG. 11).

The quantization data QDATA may be quantization data QDATA of pixels PX disposed in each unit block BLK, and include a quantized maximum value Qmax and a quantized minimum value Qmin. The predetermined quantization level PQL may correspond to a reference level for converting the quantization data QDATA into the remapping compensation value RMCV. The predetermined quantization level PQL may have levels and ranges, which correspond to the quantization data QDATA. The predetermined quantization level PQL may include a first quantization level PQL1 provided to the first value selector 410, a second quantization level PQL2 provided to the second value selector 420, and a third quantization level PQL3 provided to the third value selector 430.

Referring to FIG. 11, the first value selector 410, the second value selector 420, and the third value selector 430 of the display device in accordance with the embodiment of the present disclosure may be implemented with a multiplexer MUX. The first value selector 410, the second value selector 420, and the third value selector 430 may select one value $2^n$:1 among $2^n$ remapping compensation values.

The first value selector 410 may receive quantization data QDATA except the quantized maximum value and the quantized minimum value among the quantization data QDATA and a first quantization level PQL1, and select and output a pixel remapping compensation value Q. In other words, the first value selector 410 may not receive the quantized maximum value Qmax and the quantized minimum value Qmin. The pixel remapping compensation value Q is a value obtained by decoding the quantization data QDATA, and may be a value which is equal to or corresponds to the mapping compensation value MCV of the application processor 2000.

In an embodiment of the present disclosure, the first quantization level PQL1 may include $2^n$ (n is equal to n applied in quantization) levels. For example, when the quantization data has 4 bits, the first quantization level PQL1 may correspond to a value of −8 to +8 (excluding 0). In other words, the first quantization level PQL1 may have 16 levels, and the first value selector 410 may select, as the pixel remapping compensation value Q, a value corresponding to one level among the 16 levels.

Referring to FIG. 12, quantization data QDATA about the first quantization level PQL1 is illustrated. In an example, the first value selector 410 may select a pixel remapping compensation value Q corresponding to +1, when the quantization data QDATA is $1000_{(2)}$. However, the present disclosure is not limited thereto, and the range of the first quantization level PQL1 may be variously set in some embodiments.

The second value selector 420 may receive a quantized maximum value Qmax among the quantization data QDATA and a second quantization level PQL2, and select and output a maximum remapping compensation value $y_1$. The maximum remapping compensation value $y_1$ is a value obtained by decoding the quantized maximum value Qmax, and may be a value which is equal to or corresponds to the maximum value CVmax of the application processor 2000.

In an embodiment of the present disclosure, the second quantization level PQL2 may include $2^n$ (n is equal to n applied in quantization) levels. For example, when the quantization data has 4 bits, the second quantization level PQL2 may have 16 levels among values of 0 to 30. 0 to 30 are arbitrary constants, and the range of the second quantization level PQL2 may be changed in some embodiments of the present disclosure. In addition, an interval of each level of the second quantization level PQL2 corresponds to 2.

However, the interval of each level of the second quantization level PQL2 may be changed in some embodiments of the present disclosure.

Referring to FIG. 13, a second quantization level PQL2 is illustrated. In an example, the second value selector 420 may receive $1111_{(2)}$ as the quantized maximum value Qmax, and select, as the maximum remapping compensation value $y_1$, a value corresponding to any one level among levels of the second quantization level PQL2.

The third value selector 430 may receive a quantized minimum value Qmin among the quantization data QDATA and a third quantization level PQL3, and select and output a minimum remapping compensation value $y_2$. The minimum remapping compensation value $y_2$ is a value obtained by decoding the quantized minimum value Qmin, and may be a value which is equal to or corresponds to the minimum value CVmin of the application processor 2000.

In an embodiment of the present disclosure, the third quantization level PQL3 may include $2^n$ (n is equal to n applied in quantization) levels. For example, when the quantization data has 4 bits, the third quantization level PQL3 may have 16 levels among values of −30 to 0. −30 to 0 are arbitrary constants, and the range of the third quantization level PQL3 may be changed in some embodiments of the present disclosure. In addition, an interval of each level of the third quantization level PQL3 corresponds to 2. However, the interval of each level of the third quantization level PQL3 may be changed in some embodiments of the present disclosure.

Referring to FIG. 14, a third quantization level PQL3 is illustrated. In an example, the third value selector 430 may receive $0000_{(2)}$as the quantized minimum value Qmin, and select, as the minimum remapping compensation value $y_2$, a value corresponding to any one level among levels of the third quantization level PQL3.

The data remapper 440 may receive the remapping compensation value RMCV from the selector, and generate compensation value data CVD through a recovery linear conversion method, using the remapping compensation value RMCV. For example, the data remapper 440 may receive the pixel remapping compensation value Q from the first value selector 410, receive the maximum remapping compensation value $y_1$ from the second value selector 420, and receive the minimum remapping compensation value $y_2$ from the third value selector 430.

In an embodiment of the present disclosure, the recovery linear conversion method may correspond to primary linear reverse conversion similar to the compression linear conversion method. In an example, a primary linear reverse conversion equation may correspond to the following equations 6 and 7.

$$+8c+d=y_1 \quad \text{Equation 6}$$

$$-8c+d=y_2 \quad \text{Equation 7}$$

Here, $y_1$ is a maximum remapping compensation value, and $y_2$ is a minimum remapping compensation value.

When a calculation is performed by using Equations 6 and 7, c and d may correspond to the following equations 8 and 9.

$$c=(y_1-y_2)/16 \quad \text{Equation 8}$$

$$d=(y_1+y_2)/2 \quad \text{Equation 8}$$

Accordingly, a primary linear reverse conversion equation of the following Equation 10 may be derived.

$$CVD = \frac{(y_1 - y_2)Q + 8(y_1 + y_2)}{16} \quad \text{Equation 10}$$

CVD is compensation value data, and Q is a minimum remapping compensation value.

The data remapper 440 may output the compensation value data CVD by inputting, to Equation 10, the pixel remapping compensation value Q, the maximum remapping compensation value $y_1$, and the minimum remapping compensation value $y_2$.

The compensator 450 may receive the compensation value data CVD from the data remapper 440, and generate compensation data CDATA by reflecting the compensation value data CVD to the input image data IDATA through the application processor 2000. The compensator 450 may provide the compensation data CDATA to the data driver 300 (see FIG. 2).

According to an embodiment of the present disclosure the application processor 2000 includes: a compensation value calculator 210 configured to calculate a compensation value CV of pixels PX disposed in a unit block of a pixel unit 100 of a display device 1000, based on imaging data PDATA; a storage unit 220 configured to store a maximum compensation value CVmax and a minimum compensation value CVmin for each unit block; a linear converter 230 configured to generate a mapped compensation value MCV of the pixels disposed in one of the unit blocks by using the maximum compensation value CVmax and the minimum compensation value CVmin for that block; and a quantizer 240 configured to generate quantization data QDATA by quantizing the mapped compensation value MCV.

Hereinafter, an effect in accordance with an embodiment of the present disclosure will be described with reference to FIG. 15.

Figure 15:
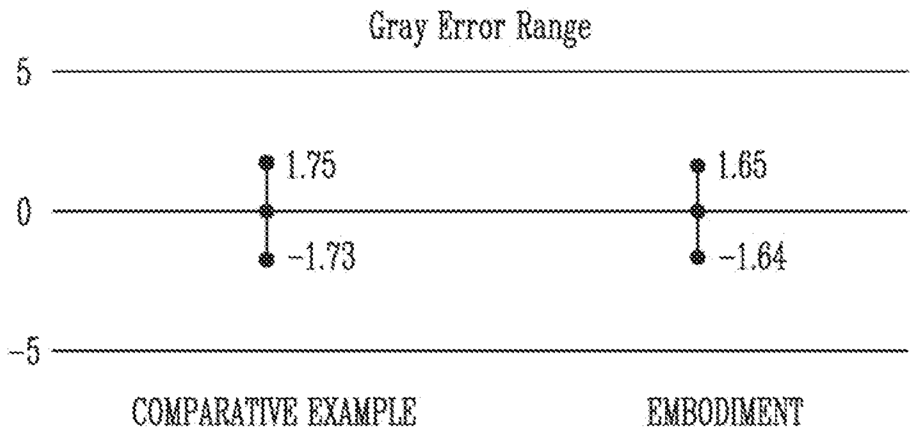
FIG. 15 is a diagram illustrating luminance correction effects of the display device in accordance with the embodiment of the present disclosure and a display device in accordance with a comparative example.

FIG. 15 is a diagram illustrating luminance correction effects of the display device in accordance with the embodiment of the present disclosure and a display device in accordance with a comparative example.

Referring to FIG. 15, in the display device in accordance with the embodiment of the present disclosure and the display device in accordance with the comparative example, gray error ranges with respect to a plurality of pixel units are illustrated.

Since the display device in accordance with the comparative example performs gray correction through a conventional method, the display device in accordance with the comparative example may have a gray error range of −1.73 to 1.75.

On the other hand, since the display device in accordance with the embodiment of the present disclosure performs gray correction through the method described with reference to FIGS. 1 to 14, the display device in accordance with the embodiment of the present disclosure may have a gray error range of −1.64 to 1.65.

In other words, in the application processor and the display device using the same in accordance with the embodiment of the present disclosure, since a maximum value and a minimum value of pixels PX of each unit block BLK are stored, a compensation value of pixels PX located adjacent to each other in each unit block BLK is not reflected. Instead, an arbitrary compensation value having no correlation with peripheral pixels may be selected and stored. Accordingly, in a display device having a low correlation between adjacent pixels or having barely any correlation between adjacent pixels, appropriate compensation data for luminance correction can be generated.

Hereinafter, a pixel included in the display device in accordance with an embodiment of the present disclosure will be described with reference to FIG. 16.

Figure 16:
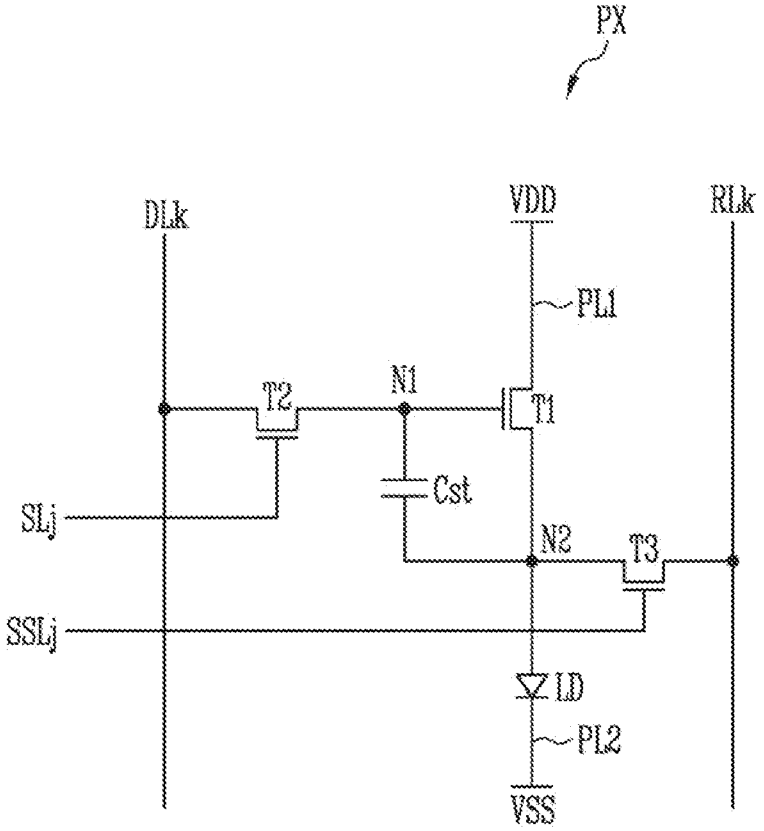
FIG. 16 is a circuit diagram illustrating an example of a pixel included in the display device shown in FIG. 2.

FIG. 16 is a circuit diagram illustrating an example of the pixel included in the display device shown in FIG. 2. For convenience of description a pixel which is located on a jth row (horizontal line) and is located on a kth column is illustrated in FIG. 16.

Referring to FIG. 16, the pixel PX may include a light emitting element LD, a first transistor T1 (e.g., driving transistor), a second transistor T2, a third transistor T3, and a storage capacitor Cst.

A first electrode (e.g., anode or cathode) of the light emitting element LD may be connected to a second node N2, and a second electrode (e.g., cathode or anode) of the light emitting element LD may be connected to the second driving voltage VSS through a second power line PL2. The light emitting element LD may generate light with a predetermined luminance corresponding to an amount of current supplied from the first transistor T1.

A first electrode of the first transistor T1 (or driving transistor) may be connected to the first driving voltage VDD through a first power line PL1, and a second electrode of the first transistor T1 may be the first electrode of the light emitting element LD. A gate electrode of the first transistor T1 may be connected to a first node N1. The first transistor T1 may control an amount of current flowing through the light emitting element LD, corresponding to a voltage of the first node N1.

A first electrode of the second transistor T2 may be connected to a data line DLk, and a second electrode of the second transistor T2 may be connected to the first node N1. A gate electrode of the second transistor T2 may be connected to a scan line SLj. The second transistor T2 may be turned on when a gate signal is supplied to the scan line SLj, to transfer a data signal from the data line DLk to the first node N1.

The third transistor T3 may be connected between a read line RLk and the second electrode of the first transistor T1 (e.g., the second node N2). In other words, a first electrode of the third transistor T3 may be connected to the read line RLk, a second electrode of the third transistor T3 may be connected to the second electrode of the first transistor T1, and a gate electrode of the third transistor T3 may be connected to a sensing control line SSLj. The third transistor T3 may be turned on when a control signal is supplied to the sensing control line SSLj, to electrically connect the read line RLk and the second node N2 (e.g., the second electrode of the first transistor T1) to each other.

In an embodiment of the present disclosure, when the third transistor T3 is turned on, the initialization voltage VINT (see FIG. 2) is applied to the second node N2. In another embodiment of the present disclosure, when the third transistor T3 is turned on, a current generated from the first transistor T1 may be supplied to a sensing unit.

The storage capacitor Cst may be connected between the first node N1 and the second node N2. The storage capacitor Cst may store a voltage corresponding to a voltage difference between the first node N1 and the second node N2.

In the embodiment of the present disclosure, the circuit structure of the pixel PX is not limited by FIG. 16. In an example, the light emitting element LD may be located between the first power line pL1 and the first electrode of the first transistor T1. In addition, a parasitic capacitor may be formed between the gate electrode of the first transistor T1 (e.g., the first node N1) and a drain electrode of the first transistor T1.

In addition, although a case where the first, second and third transistors T1, T2, and T3 are implemented with an N-type metal oxide semiconductor (NMOS) transistor is illustrated in FIG. 16, the present disclosure is not limited thereto. In an example, at least one of the first, second and third transistors T1, T2, and T3 may be implemented with a P-type metal oxide semiconductor (PMOS) transistor. In addition, the first, second and third transistors T1, T2, and T3 shown in FIG. 16 may be implemented with a thin film transistor including at least one of an oxide semiconductor, an amorphous silicon semiconductor, and a polycrystalline silicon semiconductor.

Hereinafter, a light emitting element in accordance with an embodiment of the present disclosure will be described with reference to FIG. 17.

Figure 17:
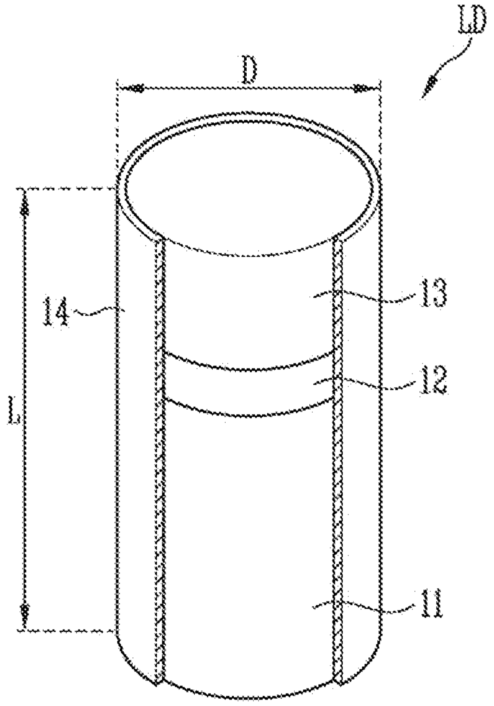
FIG. 17 is a perspective view illustrating a light emitting element included in the display device in accordance with an embodiment of the present disclosure.

FIG. 17 is a perspective view illustrating a light emitting element included in the display device in accordance with an embodiment of the present disclosure.

Referring to FIG. 17, the light emitting element LD included in the display device in accordance with the embodiment of the present disclosure includes a first semiconductor layer 11, a second semiconductor layer 13, and an active layer 12 located between the first semiconductor layer 11 and the second semiconductor layer 13. In an example, the light emitting element LD may be configured as a stack structure in which the first semiconductor layer 11, the active layer 12, and the third semiconductor layer 13 are sequentially stacked along a length L direction.

The light emitting element LD may be provided in a rod shape extending in one direction, e.g., a cylindrical shape. When assuming that an extending direction of the light emitting element LD is the length L direction, the light emitting element LD may have one end portion and the other end portion along the length L direction. Although a pillar-shaped light emitting element LD is illustrated in FIG. 17, the kind and/or shape of the light emitting element LD in accordance with the embodiment of the present disclosure is not limited thereto.

The first semiconductor layer 11 may include at least one n-type semiconductor layer. For example, the first semiconductor layer 11 may include any one semiconductor material among InAlGaN, GaN, AlGaN, InGaN, AlN, and InN, and be an n-type semiconductor layer doped with a first conductivity type dopant such as Si, Ge or Sn. However, the material constituting the first semiconductor layer 11 is not limited thereto. In addition, the first semiconductor layer 11 may be configured with various materials.

The active layer 12 is disposed on the second semiconductor layer 13, and may be formed in a single-quantum well structure or a multi-quantum well structure. In an embodiment of the present disclosure, a clad layer doped with a conductive dopant may be formed on the top and/or the bottom of the active layer 12. In an example, the clad layer may be formed as an AlGaN layer or an InAlGaN layer. In some embodiments of the present disclosure, a material such as AlGaN or AlInGaN may be used to form the active layer 12. In addition, the active layer 12 may be configured with various materials.

When a voltage equal to or higher than a threshold voltage is applied to both ends of the light emitting element LD, the light emitting element LD emits light as electron-hole pairs are combined in the active layer 12. The light emission of the light emitting element LD is controlled by using such a principle, so that the light emitting element LD can be used as a light source for various light emitting devices, including a pixel of a display device.

The second semiconductor layer 13 may be disposed on the active layer 12, and include a semiconductor layer of a type different from the type of the first semiconductor layer 11. In an example, the second semiconductor layer 13 may include at least one p-type semiconductor layer. For example, the second semiconductor layer 13 may include at least one semiconductor material among InAlGaN, GaN, AlGaN, InGaN, AlN, and InN, and include a P-type semiconductor layer doped with a second conductivity type dopant such as Mg, Zn, Ca, Sr or Ba. However, the material constituting the second semiconductor layer 13 is not limited thereto. In addition, the second semiconductor layer 13 may be formed of various materials.

In the above-described embodiment, it is described that each of the first semiconductor layer 11 and the second semiconductor layer 13 is configured with one layer. However, the present disclosure is not limited thereto. In an embodiment of the present disclosure, each of the first semiconductor layer 11 and the second semiconductor layer 13 may further include at least one layer, e.g., a clad layer and/or a Tensile Strain Barrier Reducing (TSBR) layer according to the material of the active layer 12. The TSBR layer may be a strain reducing layer disposed between semiconductor layers having different lattice structures to perform a buffering function for reducing a lattice constant difference. The TSBR may be configured with a p-type semiconductor layer such as p-GAInP, p-AlInP or p-AlGaInP, but the present disclosure is not limited thereto.

In some embodiments of the present disclosure, the light emitting element LD may further include an insulative layer or film 14 provided on a surface thereof. The insulative film 14 may be formed on the surface of the light emitting element LD to surround an outer circumferential surface of the active layer 12. In addition, the insulative film 14 may further surround one area of each of the first semiconductor layer 11 and the second semiconductor layer 13. However, in some embodiments of the present disclosure, the insulative film 14 may expose both end portions of the light emitting element LD, which have different polarities. For example, the insulative film 14 does not cover one end of each of the first semiconductor layer 11 and the second semiconductor layer 13, which are located at both ends of the light emitting element LD in the length L direction, e.g., two bottom surfaces of a cylinder (an upper surface and a lower surface of the light emitting element LD), but may expose the one ends of each of the first semiconductor layer 11 and the second semiconductor layer 13.

When the insulative film 14 is provided on the surface of the light emitting element LD, particularly, a surface of the active layer 12, the active layer 12 can be prevented from being short-circuited with at least one electrode (e.g., at least one contact electrode among contact electrodes connected to both the ends of the light emitting element LD), etc. Accordingly, the electrical stability of the light emitting element LD can be ensured.

In addition, the light emitting element LD includes the insulative film 14 on the surface thereof, so that a surface defect of the light emitting element LD can be minimized, thereby improving the lifetime and efficiency of the light emitting element LD. Further, when each light emitting element LD includes the insulative film 14, an unwanted short circuit can be prevented from occurring between a plurality of light emitting elements LD even when the light emitting elements LD are densely disposed.

In an embodiment of the present disclosure, the light emitting element LD may be manufactured through a surface treatment process. For example, when a plurality of light emitting elements LD are mixed in a liquid solution (or solvent) to be supplied to each emission area (e.g., an emission area of each pixel), each light emitting element LD may be surface-treated such that the light emitting elements LD are not unequally condensed in the solution but equally dispersed in the solution.

In an embodiment of the present disclosure, the light emitting element LD may further include an additional component in addition to the first semiconductor layer 11, the active layer 12, the second semiconductor layer 13, and the insulative film 14. For example, the light emitting element LD may additionally include at least one phosphor layer, at least one active layer, at least one semiconductor layer, and/or at least one electrode layer, which are disposed at one end of each of the first semiconductor layer 11, the active layer 12, and the second semiconductor layer 13.

The light emitting element LD may be used in various kinds of devices which require a light source, including a display device. For example, at least one light emitting element LD, e.g., a plurality of light emitting elements LD each having a size of nanometer scale to micrometer scale may be disposed in each pixel area of a display device, and a light source (or light source unit) of each pixel may be configured by using the light emitting elements LD. However, the application field of the light emitting element LD is not limited to the display device. For example, the light emitting element LD may be used in other types of devices that require a light source, such as a lighting device.

In accordance with embodiments of the present disclosure, since a maximum compensation value and a minimum compensation value of pixels of each unit block are stored in the pixel unit, a compensation value of pixels located adjacent to each other in each unit block BLK is not reflected. In this case, an arbitrary compensation value having no correlation with peripheral pixels may be selected and stored. Accordingly, in a display device having a low correlation between adjacent pixels or having hardly any correlation between adjacent pixels, appropriate compensation data for luminance correction can be generated.

Example embodiments of the present disclosure have been disclosed herein, and although specific terms are employed, they are used and are to be interpreted in a generic and descriptive sense and not for purpose of limitation. In some instances, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A method of operating a display device that includes a pixel unit including pixels disposed in a unit block, a memory and a timing controller, the method comprising:

receiving at the memory, quantization data from an application processor, and storing, at the memory, a predetermined quantization level corresponding to the quantization data; and generating, at the timing controller, compensation value data through data remapping, based on the quantization data and the predetermined quantization level, wherein the generating the compensation value data at the timing controller includes:

receiving, at a plurality of multiplexers, the quantization data and the predetermined quantization level, and selecting, at the plurality of multiplexers, a remapping compensation value, based on the quantization data and the predetermined quantization level;

generating the compensation value data with a recovery linear conversion method by using the remapping compensation value, and receiving the compensation value data, and generating compensation data by reflecting the compensation value data to input image data.

2. The method of claim 1, wherein the predetermined quantization level includes a first quantization level, a second quantization level, and a third quantization level.

3. The method of claim 2, wherein the plurality of multiplexers include a first value multiplexer configured to receive the quantization data except a quantized maximum value and a quantized minimum value among the quantization data and the first quantization level, and select and output a pixel remapping compensation value, based on the quantization data and the first quantization level.

4. The method of claim 3, wherein the plurality of multiplexers include a second value multiplexer configured to receive the quantized maximum value among the quantization data and the second quantization level, and select and output a maximum remapping compensation value, based on the quantized maximum value and the second quantization level.

5. The method of claim 4, wherein the plurality of multiplexers include a third value multiplexer configured to receive the quantized minimum value among the quantization data and the third quantization level, and select and output a minimum remapping compensation value, based on the quantized minimum value and the third quantization level.

6. The method of claim 5, wherein the recovery linear conversion method includes a primary linear reverse conversion equation, and wherein, in the primary linear inverse conversion equation, the compensation value data is output by inputting the pixel remapping compensation value, the maximum remapping compensation value, and the minimum remapping compensation value.

7. The method of claim 1, wherein the display device further includes a data driver configured to provide the pixels with a data signal to which the compensation data is applied.

8. A method of operating an application processor, the method comprising:

calculating a compensation value of pixels disposed in a unit block of a pixel unit of a display device, based on imaging data;

storing a maximum compensation value and a minimum compensation value for each unit block;

generating a mapped compensation value of the pixels disposed in one of the unit blocks by using the maximum compensation value and the minimum compensation value for that block; and generating quantization data by quantizing the mapped compensation value.

9. The method of claim 8, wherein the mapped compensation value is generated by using a compression linear conversion method.

10. The method of claim 9, wherein the compression linear conversion method includes a primary linear conversion equation, and wherein, in the primary linear conversion equation, the maximum compensation value is set as $+2^n$, and the minimum compensation value is set as $-2^n$.

11. The method of claim 10, wherein the mapped compensation value is generated by applying the compensation value of the pixels disposed in the unit block to the primary linear conversion equation.

12. The method of claim 11, wherein the mapped compensation value is in a range of $+2^n$ to $-2^n$.

13. The method of claim 8, wherein the mapped compensation value is quantized to be expressed with $2^n$ bits.

14. A method of operating a display device that includes a pixel unit including pixels disposed in a unit block, a memory, an application processor and a timing controller, the method comprising:

receiving, at the memory, quantization data from the application processor, and storing, at the memory, a predetermined quantization level corresponding to the quantization data; and generating, at the timing controller, compensation value data through data remapping, based on the quantization data and the predetermined quantization level, wherein the method further includes:

calculating, at the application processor, a compensation value of the pixels disposed in the unit block, based on the imaging data, storing, at the application processor, a maximum compensation value and a minimum compensation value for each unit block;

generating, at the application processor, a mapped compensation value of the pixels disposed in one of the unit blocks by using the maximum compensation value and the minimum compensation value for that block; and generating, at the application processor, quantization data by quantizing the mapped compensation value.

15. The method of claim 14, wherein the mapped compensation value is generated by using a compression linear conversion method.

16. The method of claim 15, wherein the compression linear conversion method includes a primary linear conversion equation, and wherein, in the primary linear conversion equation, the maximum compensation value is set as $+2^n$, and the minimum compensation value is set as $-2^n$.

17. The method of claim 16, wherein the mapped compensation value is generated by applying the compensation value of the pixels disposed in the unit block to the primary linear conversion equation.

18. The method of claim 17, wherein the mapped compensation value is in a range of $+2^n$ to $-2^n$.

19. The method of claim 14, wherein the mapped compensation value is quantized to be expressed with $2^n$ bits.

* * * * *